United States Patent [19]

Simons

[11] 4,328,139

[45] May 4, 1982

[54] FLAME RETARDANT FILLED POLYPROPYLENE COMPOSITIONS CONTAINING CARBON BLACK AND A CURED INTUMESCENT FLAME RETARDANT (IFR)

[75] Inventor: Donald M. Simons, Wilmington, Del.

[73] Assignee: E. I. Du Pont de Nemours and Company, Wilmington, Del.

[21] Appl. No.: 201,075

[22] Filed: Oct. 27, 1980

[51] Int. Cl.$^3$ .......................... C08K 5/34; C08K 5/51; C08K 3/04; C08K 5/32

[52] U.S. Cl. .................................. 252/606; 252/606; 524/502; 524/505

[58] Field of Search ............... 260/42.46, 42.45, 42.47, 260/23 H, 23.5 A, DIG. 24

[56] References Cited

U.S. PATENT DOCUMENTS

| | | | |
|---|---|---|---|
| 3,767,613 | 10/1973 | Dix et al. | 260/42.45 |
| 3,775,365 | 11/1973 | Mathis et al. | 260/42.45 |
| 4,002,595 | 1/1977 | Adelman | 260/42.46 |
| 4,010,137 | 3/1977 | Brady | 260/45.8 |
| 4,026,810 | 5/1977 | Bost | 252/8.1 |
| 4,043,975 | 8/1977 | Bost | 260/45.75 |
| 4,072,643 | 2/1978 | Bost | 260/23 H |
| 4,096,113 | 6/1978 | Brady | 260/42.46 |
| 4,115,349 | 9/1978 | Bost | 260/45.8 |
| 4,136,082 | 1/1979 | Brady | 260/45.9 |
| 4,140,856 | 2/1979 | Bost et al. | 544/195 |
| 4,151,126 | 4/1979 | Adelman et al. | 260/42.46 |
| 4,216,138 | 8/1980 | Bost et al. | 260/45.75 B |

OTHER PUBLICATIONS

Chem. Abst., vol. 86 (122400b), "Thermoplastic Resin Compositions",Murata et al., Jan. 28, 1977.

Chem. Abst., vol. 87 (103053), "Thermoplastic Resin Compositions with Improved Flame Resistance", May 25, 1977, Murata et al.

*Primary Examiner*—Herbert J. Lilling

[57] ABSTRACT

Certain filled propylene polymer compositions, especially propylene homopolymers filled with a carbon black (10–50 parts per 100 parts of polymer) and containing about 30–50 parts of intumescent fire-retardant obtained by heating a mixture of a polyol, a phosphorus acid, and melamine have very high ignition resistance and desirable physical properties. When usual inorganic fillers are used, instead of carbon black, good ignition resistance is not obtained. Carbonaceous materials other than carbon blacks, for example, acetylene blacks, graphite, and so-called Austin black reduce or completely counteract the fire-retardant activity of the intumescent fire retardant. Filled propylene polymer compositions of this invention are particularly suitable in applications where the fire hazard is particularly great, for example, in automotive parts under the hood and in electrical applications.

7 Claims, No Drawings

FLAME RETARDANT FILLED POLYPROPYLENE COMPOSITIONS CONTAINING CARBON BLACK AND A CURED INTUMESCENT FLAME RETARDANT (IFR)

BACKGROUND OF THE INVENTION

This invention relates to novel filled polypropylene compositions characterized by good physical properties and high ignition resistance.

Polypropylene, which is readily available at a reasonable cost, has found many industrial uses because of its desirable physical properties such as ease of fabrication by all conventional methods; high melting point of stereoregular, e.g., isotactic, polypropylene; and compatibility with many other commercial resins, which permits a large number of blends having specific properties. Isotactic polypropylene is inherently brittle, that is, it has a low impact resistance. Brittleness can be reduced either by copolymerizing propylene with ethylene to form block copolymers or by blending homopolypropylene with rubber, for example with EPM or EPDM elastomers. These elastomers are well known to the art. They are copolymers of ethylene with propylene and in the latter case, one or more diene monomers, at least one of which has double bonds that polymerize at different rates.

Polypropylene-based compositions have found many applications, including automobile parts, electric wire insulation and housings for appliances and instruments. Some applications demand a composition that is ignition-resistant or fire-retardant. It is known in the art that polypropylene can be fire-retarded with various combinations of halogenated organic compounds and antimony oxide, and that homopolypropylene is easier to fire-retard than are polypropylene/polyethylene block copolymers or polypropylene/elastomer blends. A disadvantage of such halogen-containing fire-retarded compositions is that they evolve toxic and corrosive fumes when exposed to flame or strong heat.

A halogen-free fire retardant for polyolefins is described in U.S. Pat. No. 4,072,643 to Bost. This material, described as 'intumescent fire retardant' (hereinafter, sometimes abbreviated IFR) - made by heating a mixture of a polyol, a phosphorus acid, and melamine - imparted a high degree of ignition resistance to polyolefin compositions as measured by the Underwriters Laboratories UL-94 test. Most sample compositions reported in the patent have a rating of V-O (the highest and most desirable rating) and a few of V-1. It has now been found, however, that IFR does not adequately fire-retard polypropylene-based compositions when various conventional mineral fillers are included in the composition. Addition of a filler is frequently desirable in order to reduce cost, increase stiffness, enhance opacity, or impart other desired properties to the composition. Accordingly, it appeared desirable to provide a filler which would not adversely affect the fire-retardant action of IFR.

SUMMARY OF THE INVENTION

According to the present invention, there is now provided a filled propylene polymer composition having good physical properties and high ignition resistance, said composition consisting essentially of:

(1) 100 parts of a propylene polymer selected from the class consisting of stereoregular homopolypropylene, propylene/ethylene block copolymers containing about 10-30 weight percent ethylene and 70-90 weight percent propylene, and blends of these polymers with each other and with an EPM or EPDM elastomer having an ethylene content of about 50-65 weight percent and a Mooney viscosity of about 35-80;

(2) about 30-50 parts of intumescent fire retardant (IFR) comprising the reaction product of a phosphorus oxide of the formula $P_2O_5xH_2O$, wherein x is a number having a value of 0 to 3; a saturated acyclic polyol having from 5 to 15 carbon atoms and from 4 to 8 hydroxyl groups per molecule; a nitrogen compound selected from the group consisting of melamine, dicyandiamide, urea and dimethylurea; and, optionally, a color improving compound of the formula $R-Y_z$ having from 2 to 24 carbon atoms per molecule, wherein Y is selected from the group consisting of $-OH$, $-COOH$, and $-NR'_2$; z is a number having a value of 1 or 2; R is a hydrocarbyl radical having a valence of z selected from the group consisting of alkyl, cycloalkyl and alkoxy, and R' is $-H$ or $-R$; which reaction product is thereafter cured by heating; and (3) about 10-50 parts of carbon black; all parts being by weight.

DETAILED DESCRIPTION OF THE INVENTION

The compositions of the present invention are prepared by merely combining the required components in correct proportions in conventional blending equipment such as a rubber mill or a mixer, for example, a Banbury mixer. This usually is done above the melting temperature of the polymeric materials.

The propylene/ethylene block copolymer can be any commercial block copolymer similar to PROFAX 8523 of Hercules, Inc., which contains about 20-25 weight percent of ethylene.

Homopolypropylene preferably should be isotactic and may be, for example, of the type corresponding to PROFAX 6323 of Hercules, Inc. Most commercial isotactic polypropylenes are suitable in the compositions of this invention. Syndiotactic homopolymers also can be used.

The EPM or EPDM elastomers suitable in the compositions of this invention can be obtained from several sources. See, for example, Table IIA, pages 840-847 of the review article entitled "Polyolefin Elastomers based on Ethylene and Propylene" by Baldwin et al. in Rubber Chemistry and Technology, Vol. 45, No. 3, Apr. 30, 1972, pages 709 ff. EPM elastomers are described, among others, in U.S. Pat. Nos. 3,817,884 to Campbell et al. and 3,819,591 to Campbell et al., and EPDM elastomers in the following U.S. Pat. Nos. 2,933,480 to Gresham et al.; 2,975,159 to Weinmayr; 3,093,620 to Gladding et al.; and 3,291,780 to Gladding et al.

Generally, these EPM or EPDM copolymers are characterized by a medium to high molecular weight, which is reflected in their Mooney viscosity range, and low to medium crystallinity resulting from their ethylene content.

IFR either is commercially available from Phillips Petroleum Company, Bartlesville, Oklahoma, or can be made according to the teachings of U.S. Pat. No. 4,072,643, particularly Example I.

All carbon blacks conventionally designated as furnace blacks, channel blacks, and thermal blacks can be used in the compositions of the present invention. Furnace blacks, especially those known as SAF, ISAF, and HAF blacks, are particularly desirable in these flame-retardant polypropylene polymer compositions. Certain channel blacks, especially MPC black, also are very good. However, not all carbonaceous fillers can be used. Specifically, acetylene black (a specialty black used to impart electrical conductance to polymers), Austin black (ground bituminous coal), and graphite adversely affect the ignition resistance of the polymeric compositions.

The degree of fire retardancy can be conveniently determined by several methods, including the oxygen test method (ASTM D-2863) and horizontal burn test (ASTM D-635), but the most severe and the most meaningful test is the Underwriters Laboratories vertical burn test (UL-94). The preferred compositions of the present invention have a V-O rating in the UL-94 test. A combination of high ignition resistance with high impact strength (notched Izod values of 50 j/m or higher) and a high flex modulus (greater than 1.3 GPa) makes these polypropylene compositions unique. Presently available polypropylene compositions fail to satisfy one or more of these requirements.

These compositions are particularly suitable in those applications where the risk of fire is particularly serious, for example, in under the hood automotive applications such as fan shrouds and in electrical applications such as, for example, wire insulation.

This invention is now illustrated by the following examples of certain representative embodiments thereof, wherein all parts, proportions, and percentages are by weight:

Compounding and Preparation of Test Specimens

Test compositions were prepared on a rubber mill. The rolls were heated to 183° C., sufficient to melt the polypropylene. Components were added on the mill in the same order as listed (see below). The compounded product was sheeted out into a thin sheet and cut into squares approximately 1.5×1.5 cm. In this form the product was fed to a ram extruder for preparation of test specimens. Specimens for the ignition (UL-94), flex modulus (ASTM D-790), and impact (ASTM D-256) tests were molded at 200° C.-210° C. and measured 12.7×1.27×0.3175 cm (5×0.5×⅛ in.).

The UL-94 test is the most severe ignition test available; samples classified as "nonburning" or "self-extinguishing" in less severe tests—for example, the oxygen index method (ASTM D-2863) or methods using horizontally positioned test specimens (ASTM D-635)—often fail to receive a UL-94 V-O rating. The notched Izod method for measuring toughness also is a severe test and is particularly valuable because the data can be correlated with knit line failure in molded plastic objects.

The compositions tested (parts of each component) as well as their physical properties are listed in the following Table I. These test results, which are given in SI units, were obtained in British units and recalculated. Examples 1-19 are control examples, outside the scope of the present invention. Examples 29-32 and 57-68 also are outside the scope of this invention.

The properties of some carbon blacks used in the above compositions are summarized in Table II. The effect of individual carbon blacks on the fire retardance of Phillips IFR is shown in Table III.

MATERIALS AND SUPPLIERS

Acetylene black—99.5% carbon (Shawinigan Products)
AMOCO 1016—Polypropylene homopolymer (Amoco)
Austin black—Ground bituminous coal (Slab Fork Coal Co.)
CABOSIL—Fumed colloidal silica (Cabot Corp.)
DIXON 1176—Graphite (Joseph Dixon Crucible Co.)
DIXON GP—Flake graphite (Joseph Dixon Crucible Co.)
EMC Mica 325—Mica, 325 mesh, mined at King's Mountain, North Carolina (English Mica Co.)
MISTRON 139—Talc (Cyprus Industrial Chemicals)
MULTIFEX IDX—Calcium carbonate (Diamond Shamrock)
NORDEL 1145—Ethylene/propylene/diene terpolymer rubber (Du Pont)
Phillips IFR—Intumescent fire retardant (Phillips Petroleum Co.)
PROFAX 6323—Polypropylene homopolymer (Hercules)
PROFAX 8523—Impact-resistant grade of polypropylene/polyethylene block copolymer
PURECAL T—Calcium carbonate (BASF Wyandotte)
SILENE D—Amorphous silica (Harwick Chemicals, PPG Industries)
SILENE EF—Calium silicate (Harwick Chemicals, PPG Industries)
SUZORITE 325—Mica, 325 mesh, mined in Canada (Marietta Resources International, Ltd.). SUZORITE is a trade name, not a mineral type.
TiO$_2$—Titanium dioxide (Du Pont).

TABLE I

| Example | 1 | 2 | 3 | 4 | 5 | 6 |
|---|---|---|---|---|---|---|
| COMPOSITION | | | | | | |
| PROFAX 8523 | 80 | 80 | | | 60 | 60 |
| PROFAX 6323 | | | 100 | 80 | 20 | 20 |
| NORDEL 1145 | 20 | 20 | | 20 | 20 | 20 |
| Phillips IFR | 35 | 35 | 35 | 35 | 35 | 35 |
| EMC Mica 325 | 35 | | | | | 35 |
| SUZORITE 325 | | 35 | | | | |
| FLEX MODULUS | | | | | | |
| kpsi | 259 | 256 | 329 | 261 | 176 | 289 |
| GPa | 1.79 | 1.77 | 2.27 | 1.80 | 1.21 | 1.99 |
| NOTCHED IZOD | | | | | | |
| A. GATE END | | | | | | |
| ft-lb/in | 1.7 | 1.7 | 0.31 | 0.88 | 3.0 | 1.6 |
| j/m | 91 | 91 | 17 | 47 | 160 | 85 |
| B. FAR END | | | | | | |
| ft-lb/in | 1.9 | 2.0 | 0.26 | 0.81 | 3.3 | 1.7 |
| j/m | 101 | 106 | 14 | 43 | 176 | 91 |
| NUMBER OF SPECIMENS (IN A SET OF 5) MEETING UL-94 V-O REQUIREMENTS | None | None | 4 | 1* | 2 | None |

| Example | 7 | 8 | 9 | 10 | 11 | 12 |
|---|---|---|---|---|---|---|
| COMPOSITION | | | | | | |
| PROFAX 8523 | 100 | | | | | |
| PROFAX 6323 | | 100 | | 100 | 100 | 100 |
| AMOCO 1016 | | | 100 | | | |
| Phillips IFR | 35 | 35 | 35 | 35 | 35 | 35 |
| EMC Mica 325 | | | | 35 | | |
| MISTRON 139 | | | | | 35 | |
| MULTIFEX IDX | | | | | | 35 |
| NUMBER OF SPECIMENS (IN A SET | | | | | | |

TABLE I-continued

| Example | 13 | 14 | 15 | 16 | 17 | 18 |
|---|---|---|---|---|---|---|
| COMPOSITION | | | | | | |
| PROFAX 6323 | 100 | 100 | 100 | 100 | 100 | 100 |
| PHILLIPS IFR | 35 | 35 | 35 | 35 | 35 | 35 |
| PURECAL T | 35 | | | | | |
| TiO2 | | 35 | | | | |
| SILENE D | | | 35 | | | |
| SILENE EF | | | | 35 | | |
| CABOSIL | | | | | 35 | |
| Glass Fiber (855 BD) | | | | | | 35 |
| NUMBER OF SPECIMENS (IN A SET OF 5) MEETING UL-94 V-O REQUIREMENTS | None | None | None | None | None | None |

| Example | 19 | 20 | 21 | 22 | 23 | 24 |
|---|---|---|---|---|---|---|
| COMPOSITION | | | | | | |
| PROFAX 8523 | | | 100 | | | 80 |
| PROFAX 6323 | 100 | 100 | | 100 | | |
| AMOCO 1016 | | | | | 100 | |
| NORDEL 1145 | | | | | | 20 |
| Phillips IFR | 35 | 35 | 35 | 35 | 35 | 35 |
| Glass Fiber (419 AA) | 35 | | | | | |
| SRF black | | 35 | 35 | 35 | 35 | 35 |
| FLEX MODULUS | | | | | | |
| kpsi | | 454 | 243 | 471 | 483 | 275 |
| GPa | | 3.13 | 1.68 | 3.25 | 3.33 | 1.90 |
| NOTCHED IZOD A. GATE END | | | | | | |
| ft-lb/in | | 0.1 | 5.1 | 0.1 | 0.1 | 1.8 |
| j/m | | 5 | 272 | 5 | 5 | 96 |
| B. FAR END | | | | | | |
| ft-lb/in | | 0.1 | 5.4 | 0.1 | 0.1 | 1.8 |
| j/m | | 5 | 288 | 5 | 5 | 96 |
| NUMBER OF SPECIMENS (IN A SET OF 5) MEETING UL-94 V-O REQUIREMENTS | None | 4 | None | All | All | None* |

| Example | 25 | 26 | 27 | 28 | 29 | 30 |
|---|---|---|---|---|---|---|
| COMPOSITION | | | | | | |
| PROFAX 8523 | 100 | | | | 100 | |
| PROFAX 6323 | | 100 | | 80 | | 100 |
| AMOCO 1016 | | | 100 | | | |
| NORDEL 1145 | | | | 20 | | |
| Phillips IFR | 35 | 35 | 35 | 35 | 35 | 35 |
| SAF black | 35 | 35 | 35 | 35 | | |
| Austin black | | | | | 35 | 35 |
| FLEX MODULUS | | | | | | |
| kpsi | 271 | 481 | 491 | 270 | 249 | 404 |
| GPa | 1.87 | 3.32 | 3.39 | 1.86 | 1.72 | 2.79 |
| NOTCHED IZOD A. GATE END | | | | | | |
| ft-lb/in | 0.70 | 0.1 | 0.1 | 1.5 | 0.76 | 0.1 |
| j/m | 37 | 5 | 5 | 80 | 41 | 5 |
| B. FAR END | | | | | | |
| ft-lb/in | 0.78 | 0.1 | 0.1 | 1.8 | 0.79 | 0.1 |
| j/m | 42 | 5 | 5 | 96 | 42 | 5 |
| NUMBER OF SPECIMENS (IN A SET OF 5) MEETING UL-94 V-O REQUIREMENTS | All* | All* | All | 3 | 2 | 1 |

| Example | 31 | 32 | 33 | 34 | 35 | 36 |
|---|---|---|---|---|---|---|
| COMPOSITION | | | | | | |
| PROFAX 8523 | | | 100 | | | |
| PROFAX 6323 | | 80 | | 100 | | 80 |
| AMOCO 1016 | 100 | | | | 100 | |
| NORDEL 1145 | | 20 | | | | 20 |
| Phillips IFR | 35 | 35 | 35 | 35 | 35 | 35 |
| Austin black | 35 | 35 | | | | |
| ISAF black | | | 35 | 35 | 35 | 35 |
| FLEX MODULUS | | | | | | |
| kpsi | 398 | 265 | 264 | 494 | 491 | 298 |
| GPa | 2.74 | 1.83 | 1.82 | 3.41 | 3.39 | 2.05 |
| NOTCHED IZOD A. GATE END | | | | | | |
| ft-lb/in | 0.13 | 0.34 | 1.2 | 0.1 | 0.1 | 0.91 |
| j/m | 7 | 18 | 64 | 5 | 5 | 49 |
| B. FAR END | | | | | | |
| ft-lb/in | 0.19 | 0.36 | 1.3 | 0.1 | 0.1 | 0.98 |
| j/m | 10 | 19 | 69 | 5 | 5 | 52 |
| NUMBER OF SPECIMENS (IN A SET OF 5) MEETING UL-94 V-O REQUIREMENTS | 2 | 1 | All* | All | All | All |

| Example | 37 | 38 | 39 | 40 | 41 | 42 |
|---|---|---|---|---|---|---|
| COMPOSITION | | | | | | |
| PROFAX 8523 | 100 | | | | 100 | |
| PROFAX 6323 | | 100 | | 80 | | 100 |
| AMOCO 1016 | | | 100 | | | |
| NORDEL 1145 | | | | 20 | | |
| Phillips IFR | 35 | 35 | 35 | 35 | 35 | 35 |
| HAF (VULCAN 3) | 35 | 35 | 35 | 35 | | |
| HAF (PHIL-BLACK O) | | | | | 35 | 35 |
| FLEX MODULUS | | | | | | |
| kpsi | 280 | 483 | 481 | 301 | 281 | 478 |
| GPa | 1.93 | 3.33 | 3.32 | 2.08 | 1.94 | 3.30 |
| NOTCHED IZOD A. GATE END | | | | | | |
| ft-lb/in | 0.91 | 0.1 | 0.1 | 0.89 | 1.0 | 0.1 |
| j/m | 49 | 5 | 5 | 48 | 53 | 5 |
| B. FAR END | | | | | | |
| ft-lb/in | 1.0 | 0.1 | 0.1 | 1.0 | 1.1 | 0.1 |
| j/m | 53 | 5 | 5 | 53 | 59 | 5 |
| NUMBER OF SPECIMENS (IN A SET OF 5) MEETING UL-94 V-O REQUIREMENTS | None | All | 4 | 4 | 2 | All |

| Example | 43 | 44 | 45 | 46 | 47 | 48 |
|---|---|---|---|---|---|---|
| COMPOSITION | | | | | | |
| PROFAX 8523 | | | 100 | | | |
| PROFAX 6323 | | 80 | | 100 | | 80 |
| AMOCO 1016 | 100 | | | | 100 | |
| NORDEL 1145 | | 20 | | | | 20 |
| Phillips IFR | 35 | 35 | 35 | 35 | 35 | 35 |
| HAF (PHIL-BLACK O) | 35 | 35 | | | | |
| MT (Thermax) | | | 35 | 35 | 35 | 35 |
| FLEX MODULUS | | | | | | |
| kpsi | 490 | 308 | 277 | 476 | 475 | 253 |
| GPa | 3.38 | 2.12 | 1.91 | 3.28 | 3.28 | 1.74 |
| NOTCHED IZOD A. GATE END | | | | | | |
| ft-lb/in | 0.1 | 1.5 | 2.4 | 0.1 | 0.19 | 1.8 |
| j/m | 5 | 80 | 128 | 5 | 10 | 96 |
| B. FAR END | | | | | | |
| ft-lb/in | 0.1 | 1.7 | 3.1 | 0.1 | 0.11 | 1.8 |
| j/m | 5 | 91 | 165 | 5 | 6 | 96 |
| NUMBER OF SPECIMENS (IN A SET OF 5) MEETING UL-94 V-O REQUIREMENTS | All | All | None | All | All | 2 |

| Example | 49 | 50 | 51 | 52 | 53 | 54 |
|---|---|---|---|---|---|---|

TABLE I-continued

| COMPOSITION | | | | | | |
|---|---|---|---|---|---|---|
| PROFAX 8523 | 100 | | | 100 | | |
| PROFAX 6323 | | 100 | | 80 | | 100 |
| AMOCO 1016 | | | 100 | | | |
| NORDEL 1145 | | | | 20 | | |
| Phillips IFR | 35 | 35 | 35 | 35 | 35 | 35 |
| GPF (STATEX G) | 35 | 35 | 35 | 35 | | |
| MPC black | | | | | 35 | 35 |
| FLEX MODULUS | | | | | | |
| kpsi | 277 | 485 | 492 | 290 | 284 | 481 |
| GPa | 1.91 | 3.34 | 3.39 | 2.00 | 1.96 | 3.32 |
| NOTCHED IZOD A. GATE END | | | | | | |
| ft-lb/in | 2.0 | 0.1 | 0.1 | 3.6 | 2.1 | 0.1 |
| j/m | 107 | 5 | 5 | 192 | 112 | 5 |
| B. FAR END | | | | | | |
| ft-lb/in | 2.2 | 0.1 | 0.1 | 3.7 | 2.4 | 0.1 |
| j/m | 117 | 0.5 | 5 | 198 | 128 | 5 |
| NUMBER OF SPECIMENS (IN A SET OF 5) MEETING UL-94 V-O REQUIREMENTS | 2 | All | 4 | 3 | All | All |

| Example | 55 | 56 | 57 | 58 | 59 | 60 |
|---|---|---|---|---|---|---|
| COMPOSITION | | | | | | |
| PROFAX 8523 | | | 100 | | | |
| PROFAX 6323 | | 80 | | 100 | | 80 |
| AMOCO 1016 | 100 | | | | 100 | |
| NORDEL 1145 | | 20 | | | | 20 |
| Phillips IFR | 35 | 35 | 35 | 35 | 35 | 35 |
| MPC black | | | | | | |
| Graphite (DIXON 1176) | | | 35 | 35 | 35 | 35 |
| FLEX MODULUS | | | | | | |
| kpsi | 479 | 286 | 305 | 529 | 524 | 314 |
| GPa | 3.30 | 1.97 | 2.10 | 3.65 | 3.61 | 2.17 |
| NOTCHED IZOD A. GATE END | | | | | | |
| ft-lb/in | 0.1 | 1.2 | 0.96 | 0.10 | 0.19 | 0.64 |
| j/m | 5 | 64 | 51 | 5 | 10 | 34 |
| B. FAR END | | | | | | |
| ft-lb/in | 0.1 | 1.3 | 1.0 | 0.11 | 0.21 | 0.66 |
| j/m | 5 | 69 | 53 | 6 | 11 | 35 |
| NUMBER OF SPECIMENS (IN A SET OF 5) MEETING UL-94 V-O REQUIREMENTS | All | 4 | None | None | None | None |

| Example | 61 | 62 | 63 | 64 | 65 | 66 |
|---|---|---|---|---|---|---|
| COMPOSITION | | | | | | |
| PROFAX 8523 | 100 | | | 100 | | |
| PROFAX 6323 | | 100 | | 80 | | 100 |
| AMOCO 1016 | | | 100 | | | |
| NORDEL 1145 | | | | 20 | | |
| Phillips IFR | 35 | 35 | 35 | 35 | 35 | 35 |
| Flake Graphite (DIXON GP) | 35 | 35 | 35 | 35 | | |
| Acetylene black | | | | | 35 | 35 |
| FLEX MODULUS | | | | | | |
| kpsi | 348 | 578 | 595 | 372 | 287 | 481 |
| GPa | 2.40 | 3.99 | 4.10 | 2.56 | 1.99 | 3.32 |
| NOTCHED IZOD A. GATE END | | | | | | |
| ft-lb/in | 1.0 | 0.15 | 0.17 | 0.66 | 1.4 | 0.1 |
| j/m | 53 | 8 | 9 | 35 | 75 | 5 |
| B. FAR END | | | | | | |
| ft-lb/in | 1.1 | 0.17 | 0.20 | 0.65 | 1.3 | 0.1 |
| j/m | 59 | 9 | 11 | 35 | 69 | 5 |
| NUMBER OF SPECIMENS (IN A SET OF 5) MEETING UL-94 V-O REQUIREMENTS | None | None | None | None | None | 2 |

| Example | 67 | 68 |
|---|---|---|
| COMPOSITION | | |
| PROFAX 6323 | | 80 |
| AMOCO 1016 | 100 | |
| NORDEL 1145 | | 20 |
| Phillips IFR | 35 | 35 |
| Acetylene black | 35 | 35 |
| FLEX MODULUS | | |
| kpsi | 488 | 304 |
| GPa | 3.36 | 2.10 |
| NOTCHED IZOD A. GATE END | | |
| ft-lb/in | 0.1 | 1.3 |
| j/m | 5 | 69 |
| B. FAR END | | |
| ft-lb/in | 0.1 | 1.6 |
| j/m | 5 | 85 |
| NUMBER OF SPECIMENS (IN A SET OF 5) MEETING UL-94 V-O REQUIREMENTS | 1 | None |

*4 specimens per set

TABLE II

PROPERTIES AND DESIGNATIONS OF SOME CARBON BLACKS

| Type | Trade Name | ASTM D-1765* Designation | Average size, nm |
|---|---|---|---|
| SAF | VULCAN 9 | N-110 | 20 |
| ISAF | VULCAN 6 | N-220 | 29 |
| MPC | INDO-TEX CB | S-301 | 28 |
| HAF | VULCAN 3 | N-330 | 45 |
| HAF | PHILBLACK O | N-330 | 27 |
| GPF | STATEX G | N-660 | 60 |
| SRF | STERLING NS | N-774 | 80 |
| MT | THERMAX | N-990 | 320–472 |

| Type | Trade Name | Surface m²/g | Typical DBP,cc/100g** |
|---|---|---|---|
| SAF | VULCAN 9 | 140 | 113 |
| ISAF | VULCAN 6 | 121 | 114 |
| MPC | INDO-TEX CB | 112 | 99 |
| HAF | VULCAN 3 | 81 | 102 |
| HAF | PHILBLACK O | 82 | 102 |
| GPF | STATEX G | 32 | 91 |
| SRF | STERLING NS | 28 | 70 |
| MT | THERMAX | 8.2 | 34 |

*ASTM D-1765 gives carbon black specifications corresponding to these designations.
**Dibutyl phthalate absorption number, ASTM D 2414-72

TABLE III

EFFECT OF CARBON BLACK TYPE ON FIRE RETARDANCY OF PHILLIPS IFR IN VARIOUS PROPYLENE POLYMER RESINS

| Carbon Black | | Fire-Retardancy Effectiveness (see key) | | |
|---|---|---|---|---|
| | | Propylene Homopolymer* | Polypropylene/Polyethylene Block Copolymer** | Polypropylene-EPDM Terpolymer Rubber Blend*** |
| Type | Trade Name | | | |
| None | | + | ⊖ | ⊖ |
| ISAF | VULCAN 6 | + | + | + |
| MPC | INDO-TEX CB | + | + | ⊕ |
| SAF | VULCAN 9 | + | + | ⊕ |
| HAF | PHILBLACK O | + | ⊖ | + |
| HAF | VULCAN 3 | + | − | ⊕ |

TABLE III-continued
EFFECT OF CARBON BLACK TYPE ON FIRE RETARDANCY OF PHILLIPS IFR IN VARIOUS PROPYLENE POLYMER RESINS

| Carbon Black | | Fire-Retardancy Effectiveness (see key) | | |
|---|---|---|---|---|
| Type | Trade Name | Propylene Homopolymer* | Polypropylene/Polyethylene Block Copolymer** | Polypropylene-EPDM Terpolymer Rubber Blend*** |
| GPF | STATEX G | + | ⊖ | ⊕ |
| SRF | STERLING NS | + | — | — |
| MT | THERMAX | + | — | ⊖ |
| Shawinigan Acetylene Black | | ⊖ | — | — |
| Austin Black 325 | | ⊖ | ⊖ | ⊖ |
| Dixon 1176 Graphite | | — | — | — |
| Dixon GP Flake Graphite | | — | — | — |

*PROFAX 6323 or AMOCO 1016
**PROFAX 8523
***PROFAX 6323/NORDEL 1145 (80/20)
Key:
+ Effective (all pass V-O)
⊕ Borderline Effective (most pass V-O)
⊖ Borderline Ineffective (most fail V-O)
— Ineffective (all fail (V-O)

It can be seen from the above experimental results that unfilled homopolypropylene is more effectively flame-retarded with IFR (Examples 3, 8, and 9) than are unfilled copolymers (Example 7) or unfilled rubber blends (Examples 4 and 5). However, polymer compositions filled with inorganic fillers could not be flame-retarded to a V-O rating. See the following examples:

| Filler | | Example |
|---|---|---|
| mica | (EMC mica 325) | 1,10 |
| | (SUZORITE 325) | 2 |
| talc | (MISTRON 139) | 11 |
| calcium carbonate | (MULTIFEX IDX) | 12 |
| | (PURECAL T) | 13 |
| titanium dioxide | | 14 |
| silica | (SILENE D) | 15 |
| | (CABOSIL) | 17 |
| calcium silicate | (SILENE EF) | 16 |
| glass fiber | | 18,19 |

Most carbon blacks tested could be tolerated without impairing the flame retardancy ratings of polymer compositions. UL-94 V-O ratings were often attained. See the following Examples:

| Carbon Black | Example |
|---|---|
| SRF | 22,23 |
| SAF | 26,27 |
| ISAF | 34,35 |
| HAF | 42,43 |
| MT | 46,47 |
| GPF | 50 |
| MPC | 54,55 |

However, some carbonaceous materials behaved like mineral fillers: Phillips IFR was not effective in combination with acetylene black, graphite or Austin black (ground bituminous coal).

See Examples 29-32 and 57-68.

I claim:

1. A filled propylene polymer composition consisting essentially of:
   (1) 100 parts of a propylene polymer selected from the class consisting of stereoregular homopolypropylene, propylene/ethylene block copolymers containing about 10-30 weight percent ethylene and 70-90 weight percent propylene, and blends of these polymers with each other and with an EPM or EPDM elastomer having an ethylene content of about 50-65 weight percent and a Mooney viscosity of about 35-80;
   (2) about 30-50 parts of intumescent fire retardant (IFR) comprising the reaction product of a phosphorus oxide of the formula $P_2O_5xH_2O$, wherein x is a number having a value of 0 to 3; a saturated acyclic polyol having from 5 to 15 carbon atoms and from 4 to 8 hydroxyl groups per molecule; a nitrogen compound selected from the group consisting of melamine, dicyandiamide, urea and dimethylurea; and, optionally, a color improving compound of the formula $R—Y_z$ having from 2 to 24 carbon atoms per molecule, wherein Y is selected from the group consisting of —OH, —COOH, and —NR'$_2$; z is a number having a value of 1 or 2, R is a hydrocarbyl radical having a valence of z selected from the group consisting of alkyl, cycloalkyl and alkoxy, and R' is —H or —R; which reaction product is thereafter cured by heating.
   (3) about 10-50 parts of carbon black selected from the group consisting of channel blacks, furnace blacks, and thermal blacks.

2. A composition of claim 1, wherein the carbon black is a furnace black.

3. A composition of claim 2, wherein the carbon black is of SAF, ISAF, or HAF type.

4. A composition of claim 1 wherein the carbon black is a channel black.

5. A composition of claim 4 wherein the carbon black is of the MPC type.

6. A composition of claim 1, wherein the propylene polymer is isotactic homopolypropylene.

7. A composition of claim 1 wherein the propylene polymer is a propylene/ethylene block copolymer containing about 20-25 weight percent of ethylene.

* * * * *